US011432110B2

(12) United States Patent
Pestov

(10) Patent No.: US 11,432,110 B2
(45) Date of Patent: Aug. 30, 2022

(54) METHOD, SYSTEM AND COMPUTER PROGRAM PRODUCT FOR GEOSPATIAL CALIBRATION

(71) Applicant: VGIS INC., Toronto (CA)

(72) Inventor: Alexandre Pestov, Toronto (CA)

(73) Assignee: VGIS INC., Toronto (CA)

( * ) Notice: Subject to any disclaimer, the term of this patent is extended or adjusted under 35 U.S.C. 154(b) by 226 days.

(21) Appl. No.: 16/485,336

(22) PCT Filed: Apr. 18, 2018

(86) PCT No.: PCT/CA2018/050463
§ 371 (c)(1),
(2) Date: Aug. 12, 2019

(87) PCT Pub. No.: WO2018/201229
PCT Pub. Date: Nov. 8, 2018

(65) Prior Publication Data
US 2021/0281975 A1 Sep. 9, 2021

Related U.S. Application Data

(60) Provisional application No. 62/500,561, filed on May 3, 2017.

(51) Int. Cl.
| H04W 4/029 | (2018.01) |
| G01C 21/00 | (2006.01) |
| H04M 1/72457 | (2021.01) |
| G01C 21/16 | (2006.01) |
| G01C 25/00 | (2006.01) |
| G06F 3/0488 | (2022.01) |
| G06T 11/00 | (2006.01) |
| H04W 4/02 | (2018.01) |

(52) U.S. Cl.
CPC .......... *H04W 4/029* (2018.02); *G01C 21/165* (2013.01); *G01C 21/3804* (2020.08); *G01C 25/00* (2013.01); *G06F 3/0488* (2013.01); *G06T 11/00* (2013.01); *H04M 1/72457* (2021.01); *H04W 4/023* (2013.01); *G06T 2200/24* (2013.01)

(58) Field of Classification Search
None
See application file for complete search history.

(56) References Cited

U.S. PATENT DOCUMENTS

| 2006/0271517 A1 | 11/2006 | Deloach | |
| 2008/0195702 A1* | 8/2008 | Matz | H04W 4/20 709/204 |

(Continued)

OTHER PUBLICATIONS

Extended European search report for application No. 18795107.4, European Patent Office, dated Dec. 16, 2020.

(Continued)

*Primary Examiner* — Hilina K Demeter
(74) *Attorney, Agent, or Firm* — Bhole IP Law; Anil Bhole; Marc Lampert

(57) ABSTRACT

The present specification relates generally to geopositioning and more specifically relates to a method, system and computer program product for calibrating absolute user location and bearing on a low geolocation accuracy computing device or a computing device without location capabilities by using a high geometric resolution map.

20 Claims, 8 Drawing Sheets

(56) References Cited

U.S. PATENT DOCUMENTS

| | | | | |
|---|---|---|---|---|
| 2009/0210277 A1* | 8/2009 | Hardin | ................ | G06Q 10/103 |
| | | | | 705/7.23 |
| 2010/0287178 A1* | 11/2010 | Lambert | ................ | G06Q 30/02 |
| | | | | 707/765 |
| 2013/0297206 A1* | 11/2013 | Heng | .................... | G01C 21/00 |
| | | | | 715/705 |
| 2014/0018095 A1* | 1/2014 | Parvizi | ................. | H04W 4/025 |
| | | | | 455/456.1 |
| 2015/0153182 A1 | 6/2015 | Tu et al. | | |
| 2016/0298969 A1* | 10/2016 | Glenn, III | ............. | G01S 5/0263 |
| 2016/0379388 A1* | 12/2016 | Rasco | ................... | G06N 5/003 |
| | | | | 715/753 |
| 2017/0201856 A1* | 7/2017 | Wilbur | ............... | G01C 21/3614 |
| 2017/0359690 A1* | 12/2017 | Crutchfield | ........... | G06F 1/1686 |
| 2018/0014271 A1* | 1/2018 | Worsfold | .............. | H04W 4/029 |

OTHER PUBLICATIONS

International Search Report for PCT/CA2018/050463, Canadian Intellectual Property Office, dated Aug. 14, 2018.
Written Opinion for PCT/CA2018/050463, Canadian Intellectual Property Office, dated Aug. 14, 2018
Canadian Notice of Allowance for 3019989, Canadian Intellectual Property Office, dated Mar. 7, 2019.

* cited by examiner

METHOD, SYSTEM AND COMPUTER PROGRAM PRODUCT FOR GEOSPATIAL CALIBRATION

FIELD OF THE INVENTION

The present specification relates generally to geopositioning and more specifically relates to a method, system and computer program product for calibrating absolute user location and bearing on a low geolocation accuracy computing device or a computing device without location capabilities by using a high geometric resolution map.

BACKGROUND OF THE INVENTION

Computing devices such as laptops, mobile devices, peripheral devices and virtual/augmented/mixed reality devices require accurate geopositioning information such as coordinates and bearing to perform tasks that rely on the location of the computing device. Typical approaches for obtaining accurate geopositioning information include using GNSS (Global Navigation Satellite System), aGPS (assisted global positioning system) and Wi-Fi-based geolocation. Bearing, which is the direction a computing device faces, is typically determined by internal or external sensors, such as a compass or magnetometer, or calculations based on movement, such as sampling location information and calculating direction based on two or more points on the computing device's travel path.

Consumer-grade computing devices often have low geolocation accuracy. More specifically, most consumer-grade computing devices, such as smartphones, smartwatches and fitness trackers, have a high geolocation accuracy tolerance with a margin of error of up to 30 meters. In contrast, in specific applications such as utility mapping, high-precision purpose-built GNSS units are used to attain location accuracy of as little as 0.1 meters. However, these high accuracy GNSS units are produced by a small group of manufacturers and are more expensive. Further, in many instances, GNSS units must be coupled with additional hardware to accomplish a specific task.

The location abilities of consumer-grade computing devices that have an accuracy of 30 meters typically exceed the acceptable margin of error for various professional applications, such as construction. Further, the accuracy of internal and external sensors and calculations based on movement may be within several arc-degrees. In addition, when near large metal objects, a bearing may not even be available. Without knowing the exact location of a computing device or the exact direction a computing device faces, consumer-grade computing devices cannot be used where accurate geolocation is required.

Aside from professional applications, other applications which may benefit from lower cost accurate geolocation calibration may include workout tracking, video games such as Pokémon GO™, and mapping tools.

Accordingly, there remains a need for improvements in the art.

SUMMARY OF THE INVENTION

In accordance with an aspect of the invention, there is provided a method, system and computer program product for calibrating absolute user location and bearing on a low geolocation accuracy computing device using a high geometric resolution map.

According to an embodiment of the invention, the present invention provides a method for calibrating absolute user location and bearing on a low geolocation accuracy computing device using a high geometric resolution map, the method comprising: displaying a high geometric resolution map to a user via a display on the computing device; receiving an identification of the user's location on the high geometric resolution map at the computing device; determining absolute location coordinates corresponding to the identification of the user's location; displaying an interactive user interface element overlaying the high geometric resolution map to the user via a display on the computing device for the user to identify their bearing on the high geometric resolution map; and receiving an identification of the user's bearing via the positioning of the interactive user interface element on the high geometric resolution map at the computing device.

According to a further embodiment of the invention, the present invention provides a system for calibrating absolute user location and bearing on a low geolocation accuracy computing device using a high geometric resolution map, the system comprising: a computing device comprising a processor, a display, a memory, an input mechanism, a transceiver, a camera and a microphone; wherein the memory comprises computer-readable instructions, which when executed by the processor, specially configure the computing device to display a high geometric resolution map to a user via a display on the computing device, receive an identification of the user's location on the high geometric resolution map at the computing device, determine absolute location coordinates corresponding to the identification of the user's location, display an interactive user interface element overlaying the high geometric resolution map to the user via a display on the computing device for the user to identify their bearing on the high geometric resolution map, and receive an identification of the user's bearing via the positioning of the interactive user interface element on the high geometric resolution map at the computing device.

According to a further embodiment of the invention, the present invention provides a computer program product for calibrating absolute user location and bearing on a low geolocation accuracy computing device using a high geometric resolution map, the computer program product comprising: a storage medium comprising computer-readable instructions, which when executed by a processor, carry out the steps of: displaying a high geometric resolution map to a user via a display on the computing device; receiving an identification of the user's location on the high geometric resolution map at the computing device; determining absolute location coordinates corresponding to the identification of the user's location; displaying an interactive user interface element overlaying the high geometric resolution map to the user via a display on the computing device for the user to identify their bearing on the high geometric resolution map; and receiving an identification of the user's bearing via the positioning of the interactive user interface element on the high geometric resolution map at the computing device.

Other aspects and features according to the present application will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example only, embodiments of the invention, and how they may be carried into effect, and in which.

Like reference numerals indicated like or corresponding elements in the drawings.

DETAILED DESCRIPTION OF THE EMBODIMENTS

Described herein are a method, system and computer program product for calibrating absolute user location and bearing on a low geolocation accuracy computing device using a high geometric resolution map.

Figure 1:
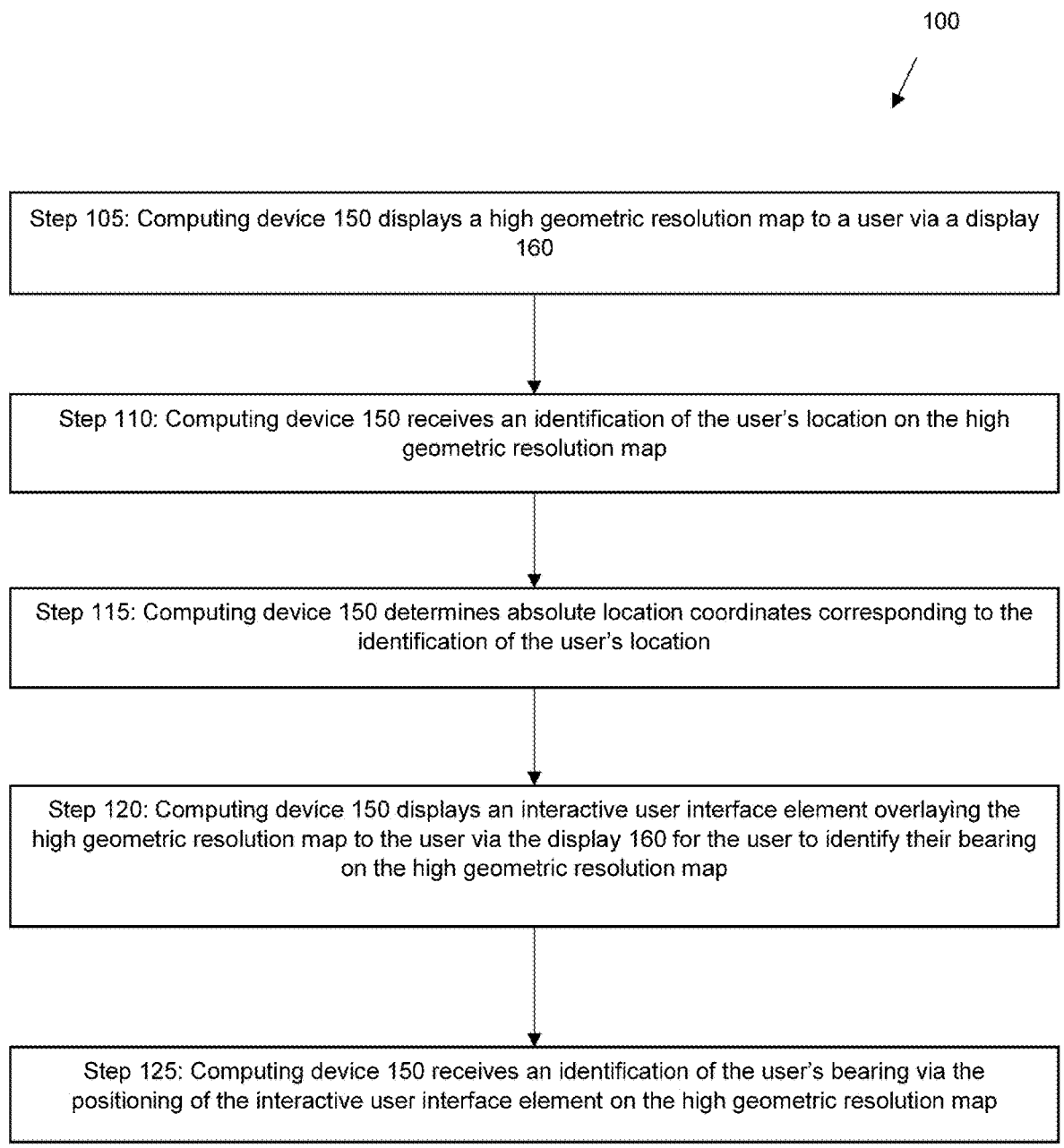
FIG. 1 is a flow diagram of a method for determining accurate geopositioning information according to an embodiment of the invention.

According to an embodiment of the present invention as shown in FIG. 1, a method 100 for calibrating absolute user location and bearing on a computing device with low geolocation accuracy or no location capabilities, such as computing device 150, using a high geometric resolution map may include displaying a high geometric resolution map to a user via a display 160 on the computing device 150 in step 105. The high geometric resolution map may be received at the computing device 150 via a transceiver 170. The high geometric map may be a satellite map, an aerial map or any other high geometric resolution map, which may have a location accuracy of less than (i.e. more accurate than) 1 meter although this may vary from application to application and some may allow for greater tolerances than 1 meter. Then in step 110, identification of the user's location on the high geometric resolution map may be received at the computing device 150. The identification of the user's location may be received via touch entry on the high geometric resolution map if the computing device 150 has a touch display or by entering an address, coordinates or a name of a place via the input mechanism 175 which may be the touch display or another input mechanism, for example a physical keyboard or a microphone 185, on the computing device 150.

For example, the user's location may be at a notable landscape feature such as where a driveway meets a sidewalk, a crack on a road, a fire hydrant or a telegraph pole. The absolute location coordinates corresponding to the identification of the user's location may be determined in step 115. Determining absolute location coordinates corresponding to the identification of the user's location may comprise communicating with a map provider via the transceiver 170 or alternatively, the location coordinates may already be associated with the map stored locally on the computing device 150. Suitable map providers include Google, Bing, Here and Esri and other high-resolution map providers.

Then in step 120, an interactive user interface element, such as a line, or a point, or another symbol overlaying the high geometric resolution map may be displayed to the user via the display 160 on the computing device 150 for the user to identify their bearing on the high geometric resolution map. This interactive user interface element may be repositioned to correspond to the user's bearing or used to click on the virtual object to align the calibrated computing device 150 with it. Finally, an identification of the user's bearing via the positioning of the interactive user interface element on the high geometric resolution map may be received at the computing device 150 in step 125 following the user's selection of bearing.

The identification of the user's bearing via the positioning of the interactive user interface element, such as a line, on the high geometric resolution map may be received via the input mechanism 175 such as touch entry on a touch display or another input mechanism such as a physical keyboard on the computing device 150. The interactive user interface element on the high geometric resolution map may be positioned in alignment with an object located at a suggested distance of between 30 and 100 meters, although shorter or longer distances may be used. The object may be any object visible on the map including, for example, a fire hydrant, a telegraph pole, a bus stop or a traffic light. According to an embodiment, the user may point the computing device 150 at the selected object to align the interactive user interface element on the display 160 with the selected object also appearing on the display 160 via input from the camera 180 of the computing device 150. Once alignment is completed, the user may send a command via touch entry or voice entry to lock in the alignment. According to a further embodiment, automatic image recognition may be used to lock in the alignment.

Using the absolute location coordinates and the user's bearing, the relative positions of one or more objects to the user may be determined at the computing device 150. The computing device 150 may store the absolute location coordinates corresponding to the identification of the user's location and identification of the user's bearing in a memory 165 accessible to the computing device 150, which may be retrieved for future use. This may occur when the user moves the computing device 150 thereby changing the user's location and bearing. After calibration of absolute location and bearing, this further movement may be measured through the use of an accelerometer and gyroscope (or compass or magnetometer) on the user's computing device and the new position and bearing may displayed to the user via the relative distance and changes in direction from the calibrated absolute location and bearing.

Figure 2:
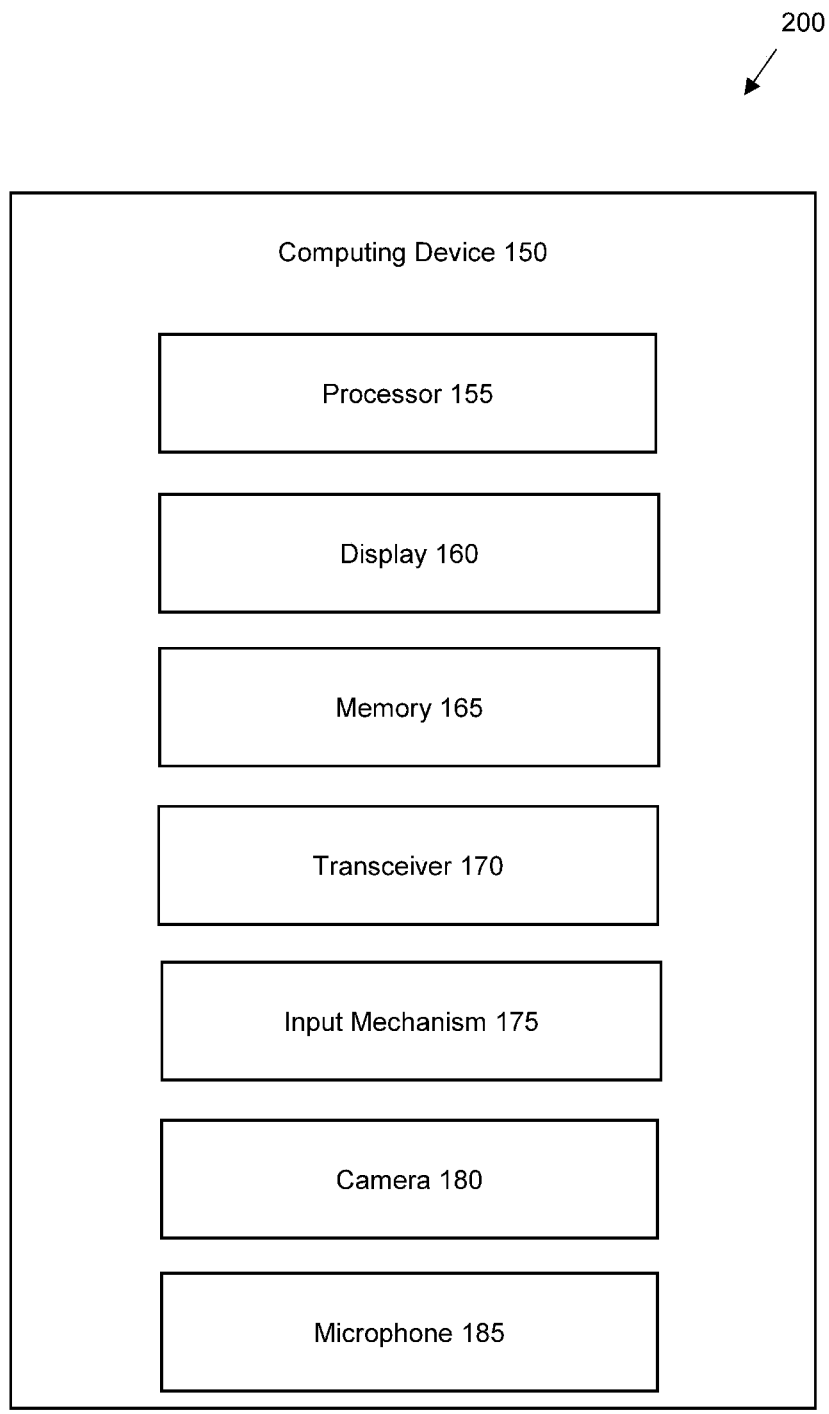
FIG. 2 is a system diagram for determining accurate geopositioning information according to an embodiment of the invention.

According to a further embodiment of the present invention as shown in FIG. 2, a system 200 for calibrating absolute user location and bearing on a low geolocation accuracy computing device using a high geometric resolution map may comprise a computing device 150 such as a smartphone 350, a tablet computer or a virtual, augmented or mixed-reality device, for example mixed-reality goggles. According to an embodiment, the low geolocation accuracy computing device 150 may comprise a computing device without any location capabilities whatsoever.

Computing device 150 may include a processor 155, a display 160, a memory 165, a transceiver 170, a camera 180, a microphone 185 for receiving voice commands, and an input mechanism 175, which may be a touch sensitive display which may provide a virtual keyboard, a physical keyboard or another mechanism for inputting information to the computing device 150 apart from the transceiver 170, camera 180 and microphone 185. The memory 165 may comprise computer-readable instructions, such as in the form of a computer software application or "app", which when executed by the processor 155 may specially configure the computing device 150 to display a high geometric resolution map to a user via the display 160 on the computing device 150, to receive an identification of the user's location on the high geometric resolution map at the computing device 150, to determine absolute location coordinates corresponding to the identification of the user's location, to display an interactive user interface element overlaying the high geometric resolution map to the user via the display 160 on the computing device 150 for the user to identify their bearing on the high geometric resolution map, and to receive an identification of the user's bearing via the positioning of the interactive user interface element on the high geometric resolution map at the computing device 150. These instructions may also specially configure the computing device 150 receive the high geometric resolution map at the computing device 150 via the transceiver 170, to determine the relative positions of one or more objects to the user, for example, fire hydrants or underground pipes, using the absolute location coordinates and the user's bearing, and to receive inputs from an accelerometer and gyroscope and use them to determine a new position and bearing relative to the absolute location and bearing from calibration.

Figure 3:
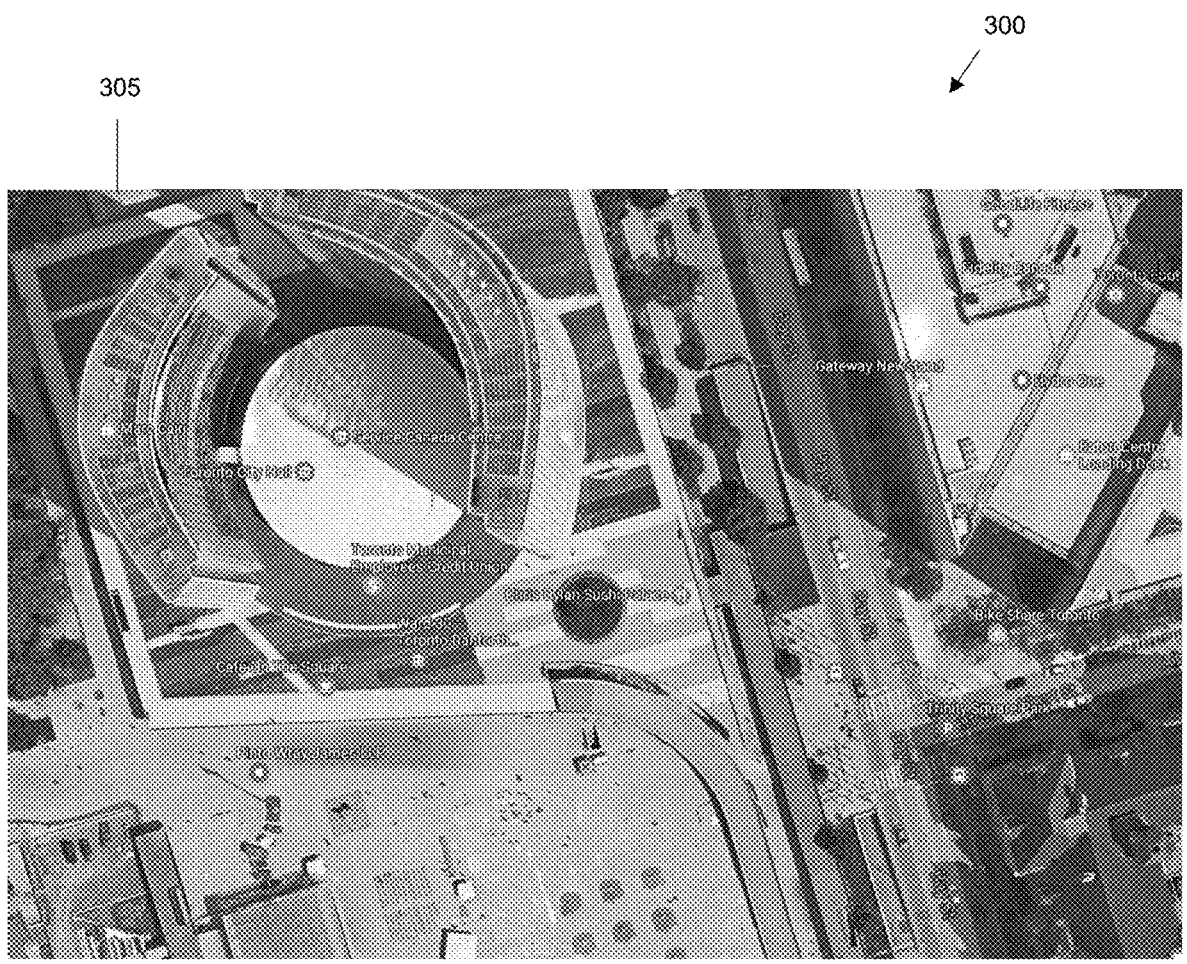
FIG. 3 is a satellite map displayed on a computing device according to an embodiment of the invention.

According to an embodiment as shown in FIGS. 3-8, a method 300 for calibrating absolute user location and bearing on a computing device, such as smartphone 350, may comprise displaying a high-resolution satellite map 305 of an area where the smartphone 350 is located, wherein the satellite map 305 may be retrieved from a satellite map provider or loaded from the device memory or obtained from another source (FIG. 3). A presentation layer may be calculated to ensure coordinates on the presentation layer align with map information received from the satellite map provider. Upon alignment of the satellite map 305 with points on a display, the satellite map 305 may be displayed to the user. A user may navigate to its physical location on the satellite map 305 manually. According to an embodiment, low-precision GPS such as that on the computing device 150 may be used to identify the user's approximate location.

Figure 4:
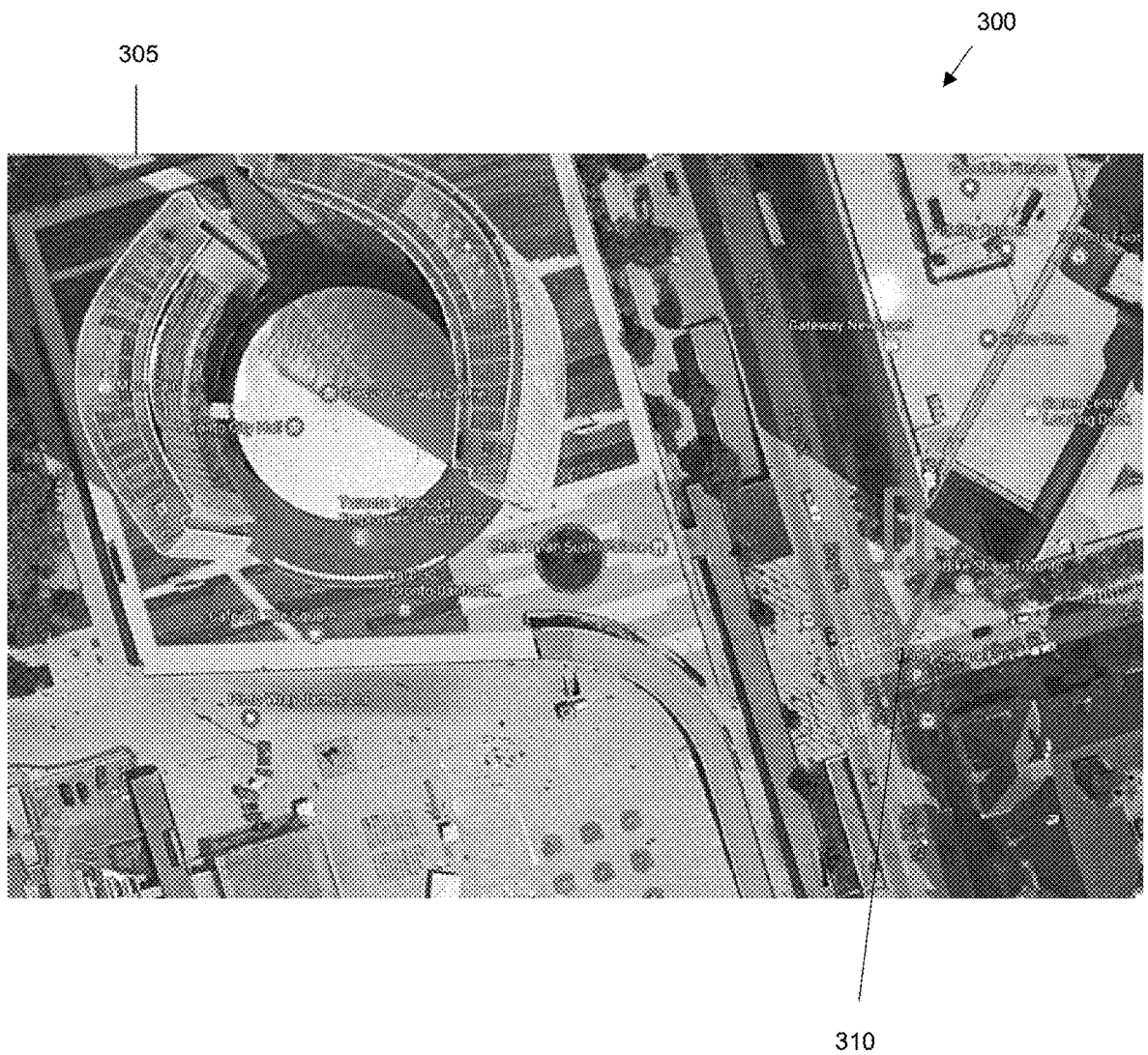
FIG. 4 is the satellite map of FIG. 3 displayed on a computing device with a point marked by the user according to an embodiment of the invention.
Figure 5:
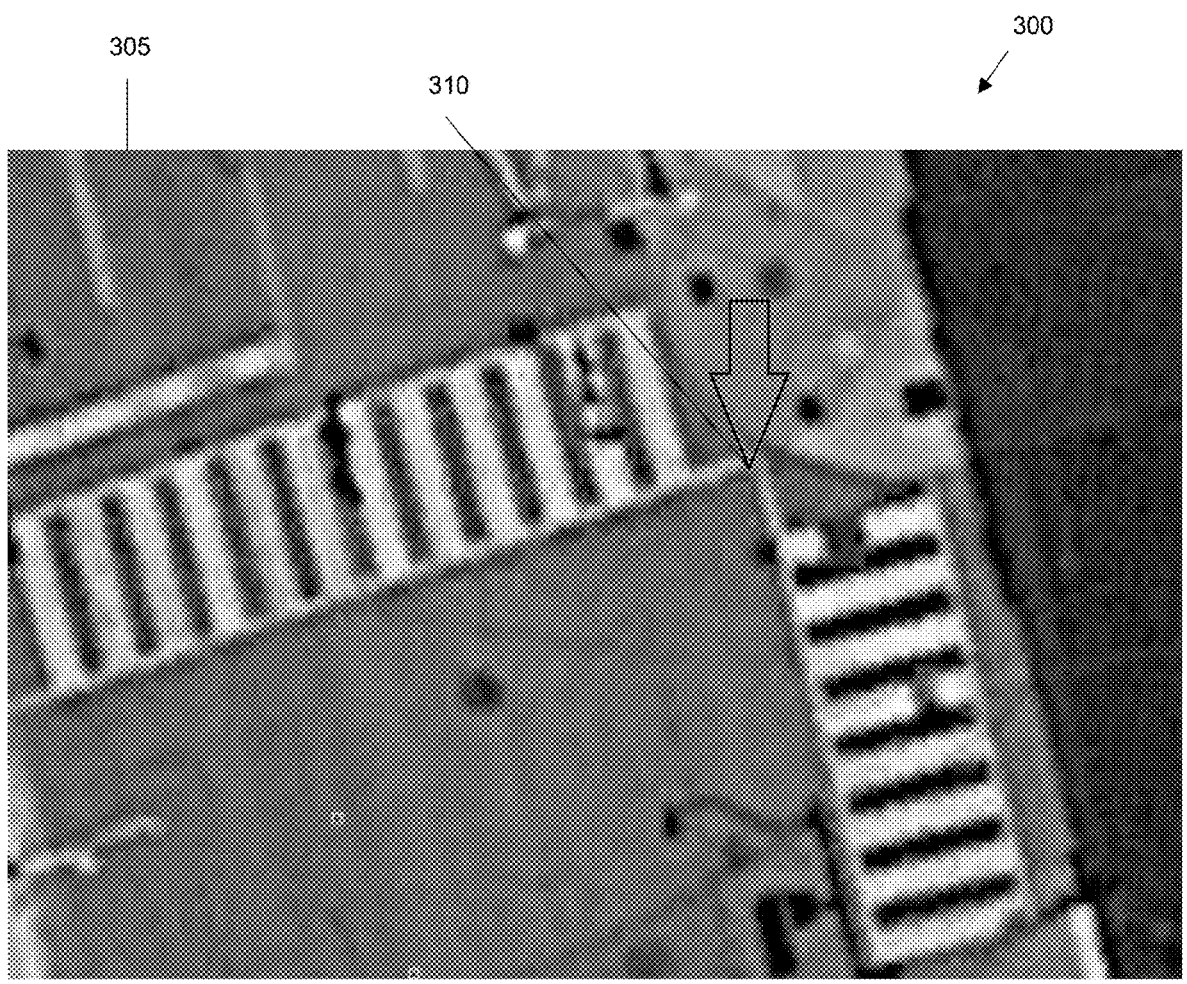
FIG. 5 is a magnified satellite map of the satellite map shown in FIG. 4 about the point marked by the user as displayed on a computing device according to an embodiment of the invention.

As shown in FIGS. 4-5, the user may identify a point, such as point 310 where, in this instance, two crosswalks meet on the satellite map 305. According to an embodiment, the user may alternatively identify a nearby landscape feature visible on the satellite map 305. If low-precision GPS was used to identify its approximate location, the user may adjust the identified location by positioning him or herself along with the smartphone 350 at the point 310. The user may mark the point 310 on the satellite map 305. For increased accuracy, the user may magnify the satellite map 305 or may zoom in on the satellite map 305 to mark the point 310 on the satellite map 305.

According to an embodiment, anchor points, such as manhole cover icons, may be displayed to aid the user in determining their location at a faster rate. This may be useful where the location identified by the user is near or on top of known objects, such as a sewer inlet. For instance, an icon of the sewer inlet may be displayed on the satellite map 305. To allow the user to identify a location immediately, the user may position itself on top of the sewer inlet and then choose the anchor point. The point 310 may then be confirmed by the user to lock in the selection. Upon confirmation by the user, the smartphone 350 may request location coordinates from the satellite map provider or the location coordinates may be retrieved from memory on the smartphone 350 or from another available source.

Figure 6:
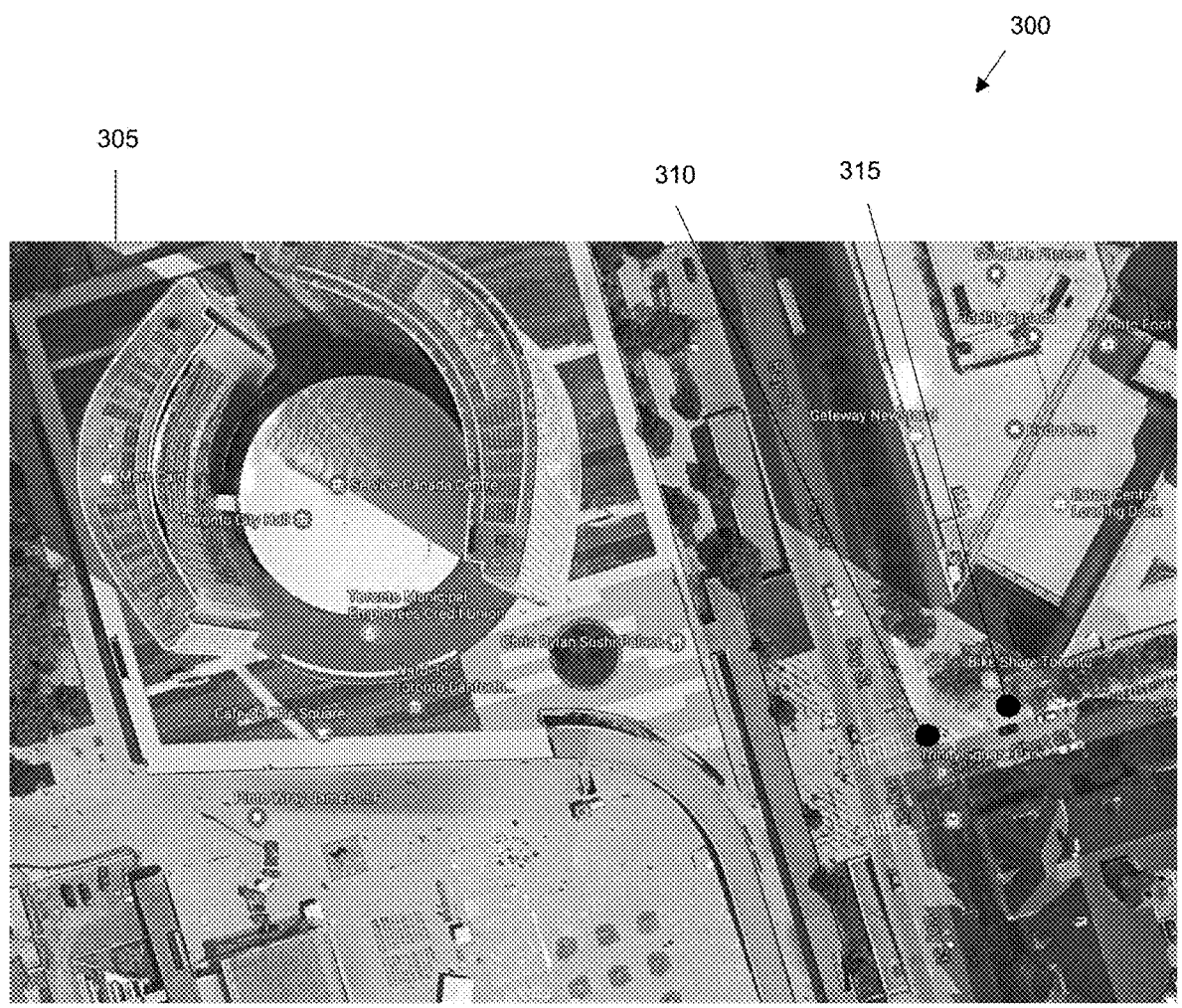
FIG. 6 is a satellite map as shown in FIG. 4 with an additional point marked as detected by a low precision GPS such as in a consumer-grade computing device displayed on the computing device according to an embodiment of the invention.
Figure 7:
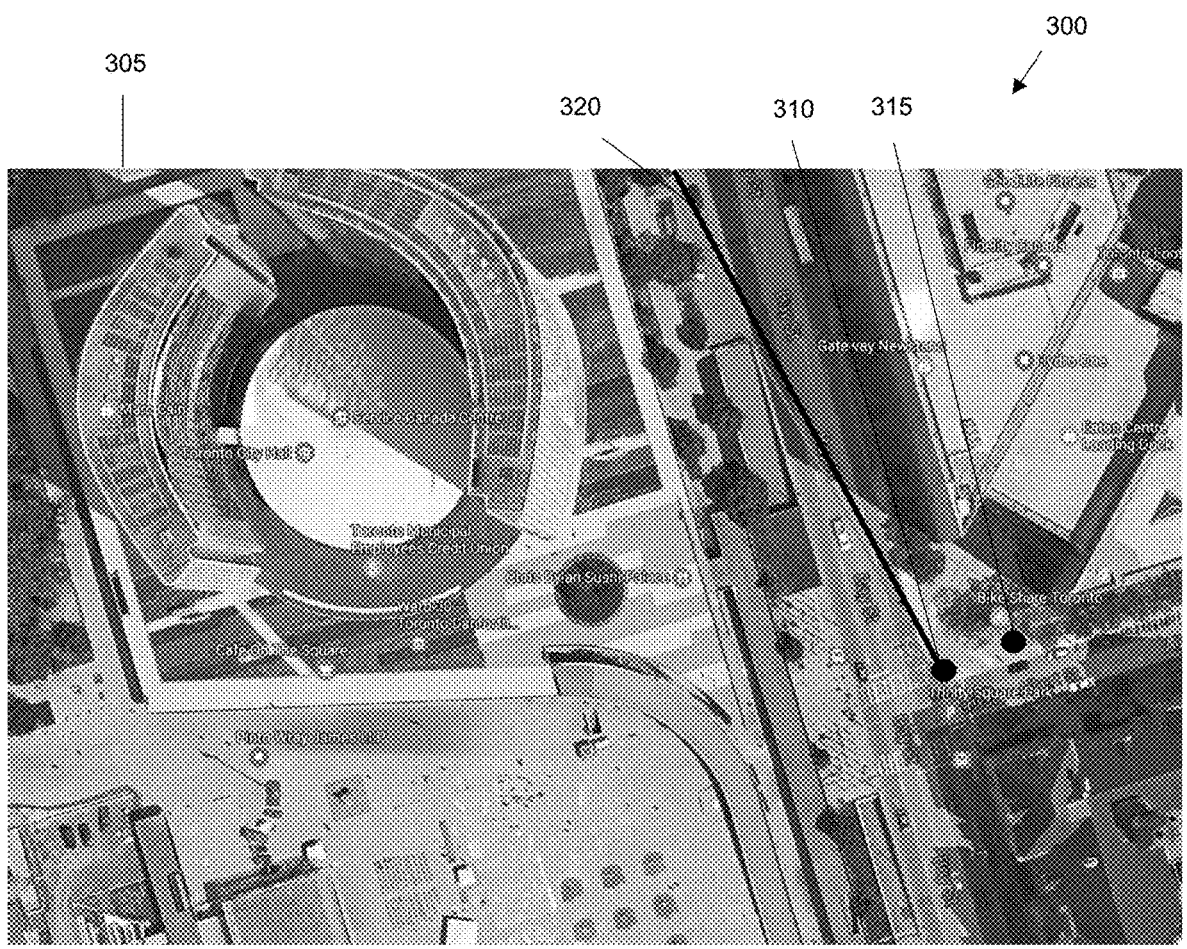
FIG. 7 is a satellite map of FIG. 6 also displaying a line used to select bearing as displayed on a computing device according to an embodiment of the invention.

As shown in FIG. 6, point 315 may be the location identified by low-precision GPS whereas the point 310 may be the location manually identified by the user. As shown in FIG. 7, the smartphone 350 may further display a line 320 on the satellite map 305 from the point 310. The user may select an object visible on the satellite map 305 and rotate the line 320 such that the line 320 aligns from the point 310 to the object. The object may be placed at a suggested distance of between 30 meters and 100 meters from the user (although shorter or longer distances may be used). The smartphone 350 may request coordinates from the satellite map provider or coordinates may be retrieved from memory on the smartphone 350 or obtained from another source. Bearing may be calculated based on the difference between the two selected coordinates.

Figure 8:
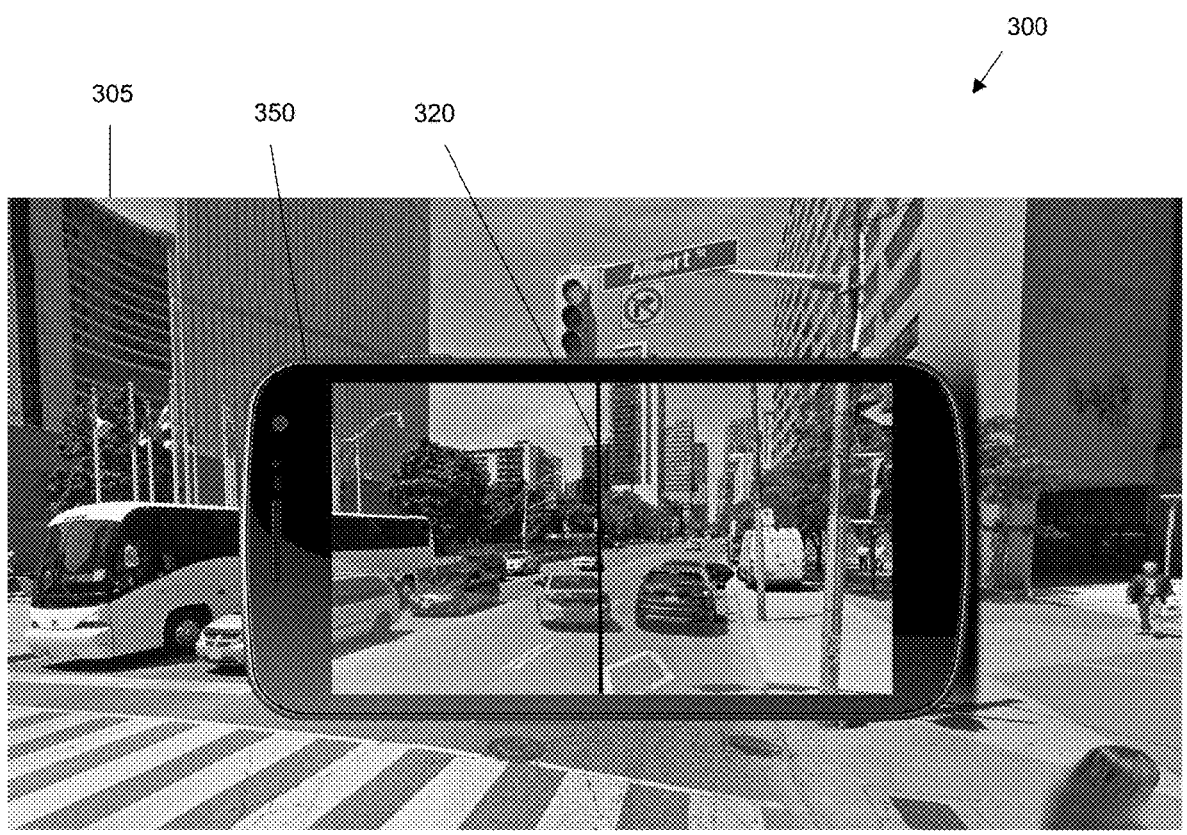
FIG. 8 shows a corresponding line as in FIG. 7 used to select bearing through pointing the camera of a smartphone at an object according to an embodiment of the invention.

According to an embodiment as shown in FIG. 8, the user may point the smartphone 350, wherein the smartphone 350 or other augmented reality device may display the line 320 down the center of the smartphone 350, to align the line 320 with the selected object. Once alignment is completed, the user may send a command via touch entry or voice entry to lock in the alignment.

Absolute user location and bearing may be used for geotagging, determining relative positions of one or more objects to the user using internal and external sensors as well as for a multitude of other tasks. With absolute user location and bearing, the computing device 150 may calculate where the user is in space relative to where it was. This calculation may be achieved using sensors such as accelerometers and gyroscopes, which may calculate pitch, roll, yaw and travel distance. For example, accelerometers and gyroscopes may determine that the user moved 25 feet away from the absolute user location and turned 30 degrees from the user's bearing. As a second example, absolute user location and bearing may be used with virtual/augmented/mixed reality devices. Upon determining absolute user location and bearing, the computing device 150 may display objects or guide the user to a destination with step-by-step directions.

The capability to calibrate absolute user location and bearing may provide computing devices with low geolocation accuracy or without location capabilities to gain high-precision GPS (global positioning system) movement tracking abilities (i.e. movements under 0.5 meters) over short distances (i.e. under 100 meters). Further, absolute user location and bearing may allow computing devices with low geolocation accuracy or without location capabilities to be almost as accurate and occasionally more accurate than high-precision GNSS units. Therefore, computing devices with low geolocation accuracy or without location capabilities may act as a substitute to high-precision GNSS units. Substitution may be especially advantageous in high-density urban areas where high-precision GNSS units may be incapable of locking accurate locations.

Using Google Earth in most North American cities may achieve a location accuracy of under 0.03 meters per map pixel and a heading accuracy of 0.05 degrees per map pixel 100 meters away. This may achieve an accuracy, under common conditions, of 0.03 meters and +/−0.1 arc-degrees.

When compared to high-precision GNSS units, which may have an accuracy of 0.1 meters and +/−1.5 arc-degrees, the accuracy of Google Earth may be 3 and 15 times more accurate, respectively.

To help the user accurately choose their location on the high geometric resolution map, oversampling or super-zooming of the map may be used. For example, if each pixel on a map represents 0.1 meters, the map may be stretched (i.e. super-zoomed) such that each pixel of the original map corresponds to 10 pixels on super-zoomed image. The super-zoomed image will have the same quality as the original one (i.e. the stretch image will be very pixelated), however the enlarged image may allow for more accurate placement of the user's location by the user.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description and all changes which come within the meaning and range of equivalency of the claims are therefore intended to be embraced therein.

What is claimed is:

1. A method for calibrating absolute user location and bearing on a low geolocation accuracy computing device using a high geometric resolution map, the method comprising:
   displaying a high geometric resolution map to a user via a display on the computing device;
   displaying a first and a second interactive user interface element overlaying the high geometric resolution map to the user via a display on the computing device;
   receiving input from the user on an input mechanism associated with the computing device, the input comprising manually positioning the first interactive user interface element with a first corresponding object visibly displayed on the high geometric resolution map to be representative of the user's physical location;
   determining absolute location coordinates corresponding to the manually positioned location of the first interactive user interface element, the absolute location coordinates representative of a calibrated position of the user relative to the high geometric resolution map; and
   receiving further input from the user on the input mechanism associated with the computing device, the further input comprising manually aligning the second interactive user interface element with a second corresponding object visibly displayed on the high geometric resolution map, a difference in the direction from the first interactive user interface element to the second interactive user interface element represents a calibrated bearing of the user.

2. The method of claim 1, wherein determining absolute location coordinates corresponding to the identification of the user's location comprises communicating with a map provider via a transceiver.

3. The method of claim 1, wherein the computing device comprises a smartphone, a tablet computer, or a virtual, mixed or augmented reality headset.

4. The method of claim 1, wherein the input received from the user is received via touch entry on the high geometric resolution map or entering an address, coordinates or a name of a place via another input mechanism on the computing device.

5. The method of claim 1, wherein the computing device stores the absolute location coordinates corresponding to the identification of the user's location and identification of the user's bearing in a memory accessible to the computing device.

6. The method of claim 1, wherein the identification of the user's bearing via the positioning of the interactive user interface element on the high geometric resolution map is received via touch entry on the computing device.

7. The method of claim 1, wherein relative positions of one or more objects to the user are determined at the computing device using the absolute location coordinates and the user's bearing.

8. The method of claim 1, wherein the low geolocation accuracy computing device comprises a computing device without location capabilities.

9. A system for calibrating absolute user location and bearing on a low geolocation accuracy computing device using a high geometric resolution map, the system comprising:
   a computing device comprising a processor, a display, a non-transitory memory, an input mechanism, a transceiver, a camera and a microphone;
   wherein the non-transitory memory comprises computer-readable instructions, which when executed by the processor, specially configure the computing device to:
   display a high geometric resolution map to a user via a display on the computing device,
   display a first and a second interactive user interface element overlaying the high geometric resolution map to the user via a display on the computing device,
   receive input from the user on an input mechanism associated with the computing device, the input comprising manually positioning the first interactive user interface element with a first corresponding object visibly displayed on the high geometric resolution map to be representative of the user's physical location,
   determine absolute location coordinates corresponding to the manually positioned location of the first interactive user interface element, the absolute location coordinates representative of a calibrated position of the user relative to the high geometric resolution map, and
   receive further input from the user on the input mechanism associated with the computing device, the further input comprising manually aligning the second interactive user interface element with a second corresponding object visibly displayed on the high geometric resolution map, a difference in the direction from the first interactive user interface element to the second interactive user interface element represents a calibrated bearing of the user.

10. The system of claim 9, wherein determining absolute location coordinates corresponding to the identification of the user's location comprises communicating with a map provider via the transceiver.

11. The system of claim 9, wherein the computing device comprises a smartphone, a tablet computer, or a virtual, mixed or augmented reality headset.

12. The system of claim 9, wherein the input received from the user is received via touch entry on the high geometric resolution map or entering an address, coordinates or a name of a place via another input mechanism on the computing device.

13. The system of claim 9, wherein the identification of the user's bearing via the positioning of the interactive user interface element on the high geometric resolution map is received via touch entry or another input mechanism on the computing device.

14. The system of claim 9, wherein the computing device stores the absolute location coordinates corresponding to the identification of the user's location and identification of the user's bearing in the memory.

15. The system of claim 9, further comprising instructions for determining relative positions of one or more objects to the user using the absolute location coordinates and the user's bearing.

16. The system of claim 9, wherein the low geolocation accuracy computing device comprises a computing device without location capabilities.

17. A computer program product for calibrating absolute user location and bearing on a computing device with low geolocation accuracy or no location capabilities using a high geometric resolution map, the computer program product comprising:
 a non-transitory storage medium comprising computer-readable instructions, which when executed by a processor, carry out the steps of:
 displaying a high geometric resolution map to a user via a display on the computing device;
 displaying a first and a second interactive user interface element overlaying the high geometric resolution map to the user via a display on the computing device; and
 receiving input from the user on an input mechanism associated with the computing device, the input comprising manually positioning the first interactive user interface element with a first corresponding object visibly displayed on the high geometric resolution map to be representative of the user's physical location;
 determining absolute location coordinates corresponding to the manually positioned location of the first interactive user interface element, the absolute location coordinates representative of a calibrated position of the user relative to the high geometric resolution map;
 receiving further input from the user on the input mechanism associated with the computing device, the further input comprising manually aligning the second interactive user interface element with a second corresponding object visibly displayed on the high geometric resolution map, a difference in the direction from the first interactive user interface element to the second interactive user interface element represents a calibrated bearing of the user.

18. The computer program product of claim 17, further comprising instructions for determining relative positions of one or more objects to the user using the absolute location coordinates and the user's bearing.

19. The method of claim 1, further comprising receiving sensor data from an accelerometer, a gyroscope, or both, and determining a further location and bearing starting from the absolute location coordinates and the calibrated bearing.

20. The system of claim 9, wherein the computing device further receives sensor data from an accelerometer, a gyroscope, or both, and determines a further location and bearing starting from the absolute location coordinates and the calibrated bearing.

* * * * *